J. P. METZGER.
COMBINED PRESSURE REGULATING AND GOVERNING APPARATUS.
APPLICATION FILED JAN. 14, 1920.

1,369,692.

Patented Feb. 22, 1921.
2 SHEETS—SHEET 1.

WITNESSES

INVENTOR
Jules P. Metzger
BY
ATTORNEYS

UNITED STATES PATENT OFFICE.

JULES P. METZGER, OF CARLSTADT, NEW JERSEY, ASSIGNOR TO THE LESLIE CO., OF LYNDHURST, NEW JERSEY, A CORPORATION OF NEW JERSEY.

COMBINED PRESSURE REGULATING AND GOVERNING APPARATUS.

1,369,692.            Specification of Letters Patent.      Patented Feb. 22, 1921.

Application filed January 14, 1920. Serial No. 351,354.

*To all whom it may concern:*

Be it known that I, JULES P. METZGER, a citizen of the United States, and a resident of Carlstadt, in the county of Bergen and State of New Jersey, have invented a new and Improved Combined Pressure Regulating and Governing Apparatus, of which the following is a full, clear, and exact description.

The invention relates to pressure regulators such as shown and described in the Letters Patent of the United States No. 1,244,226 and No. 1,308,638, granted to me on October 23, 1917, and July 1, 1919, respectively, and in the application for Letters Patent of the United States, Serial No. 351,352 filed by me under even date herewith.

The object of the present invention is to provide a new and improved combined pressure regulating and governing apparatus arranged to act as an automatic pressure regulating valve or as an automatic stop valve or as an emergency stop valve.

Another object is to permit of minute adjustment of the main parts of the apparatus and to dispense with packings, glands, stuffing boxes and other devices producing frictional resistance with a view to render the apparatus exceedingly sensitive.

Another object is to control at a predetermined pressure a fluid to be supplied to one or more engines, a pump or other device to be actuated by a motive agent, and to shut off the supply of fluid delivered in case of a rupture or leak in the delivery pipe to the appliance.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in both views.

Figure 1:
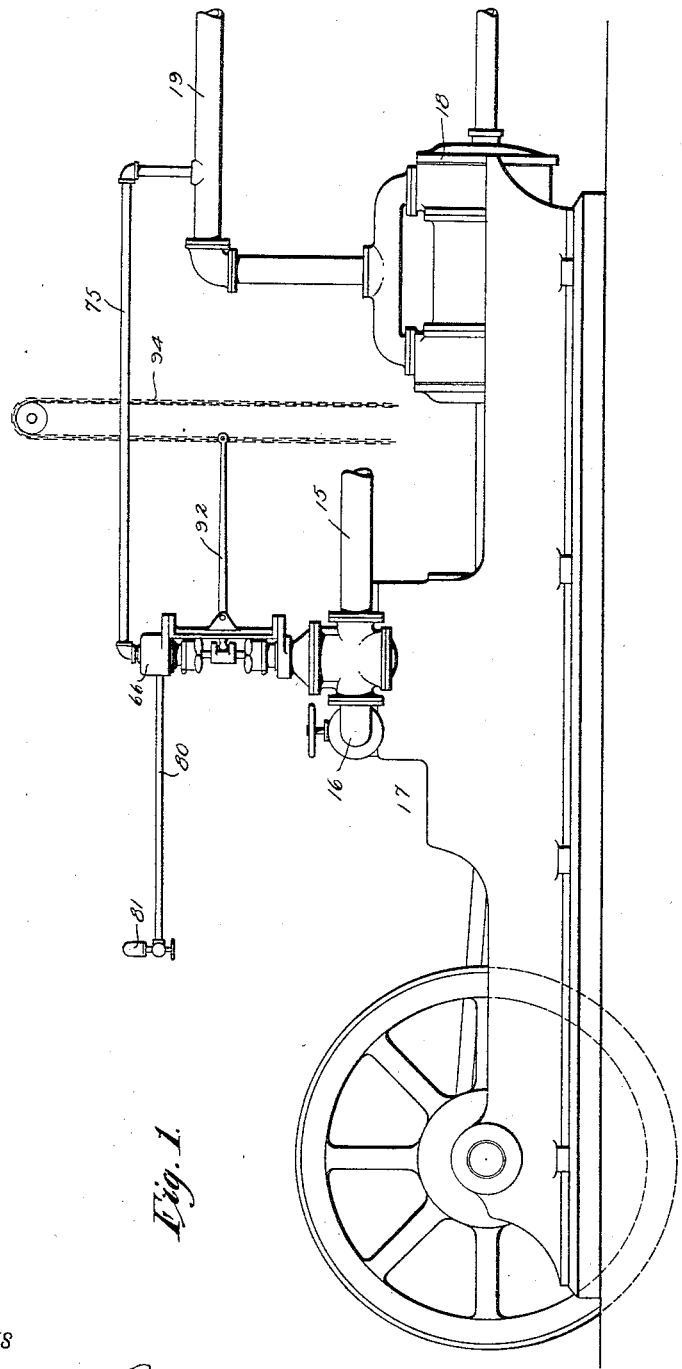
Figure 2:
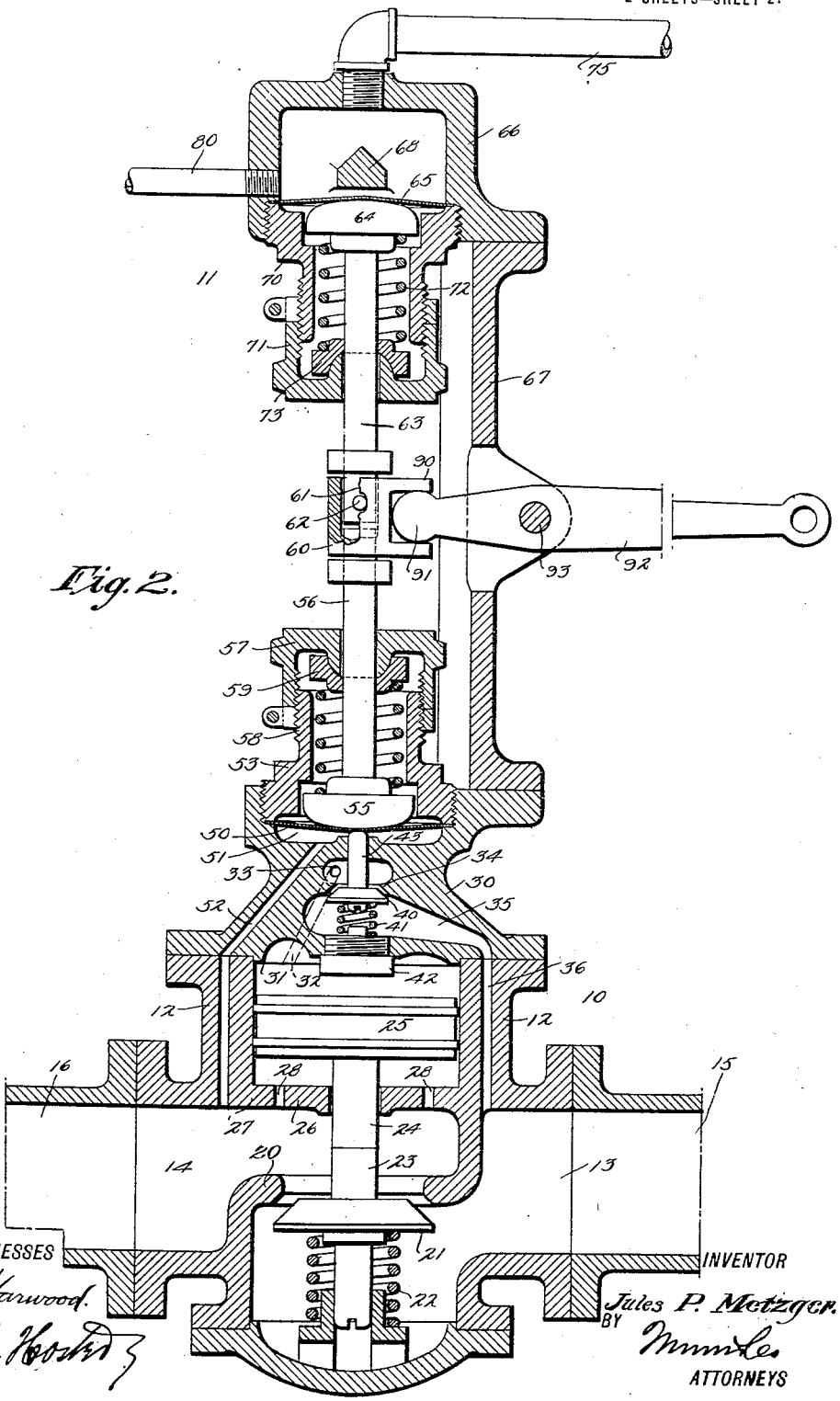

Figure 1 is a side elevation of the improved combined pressure regulating and governing device as applied to an air compressor; and Fig. 2 is an enlarged sectional side elevation of the improved combined regulating and governing device.

The pressure regulating and governing device in its general construction comprises a fluid pressure regulator 10 and a fluid governing device 11, of which the regulator 10 has its body 12 provided with an inlet 13 and an outlet 14 of which the inlet 13 is connected by a pipe 15 with a boiler or other suitable source of motive agent supply. The outlet 14, as shown in Fig. 1, is connected by a pipe 16 with the steam compartment of an engine 17 comprising an air compressor 18 used for supplying compressed air by a delivery pipe 19 to a tank or other receiving vessel or apparatus. A valve seat 20 within the body 12 connects the inlet 13 with the outlet 14 and this valve seat 20 is controlled by a valve 21 normally held to its seat by a light spring 22. The upper end of the stem 23 of the valve 21 is connected with the stem 24 of a piston 25 mounted to reciprocate in a cylinder 26 formed within the body 12 and separated from the outlet 14 by a horizontal partition 27 having openings or ports 28 to connect the lower end of the cylinder 26 with the outlet 14. The upper end of the cylinder 26 is closed by a cap 30 provided at the under side with a recess 31 connected by one or more ports 32 with a chamber 33 arranged in the cap 30. The chamber 33 is provided at the under side with a valve seat 34 opening into an expansion chamber 35 formed in the cap 30 and connected by a port 36 with the inlet 13 of the valve body 12. The valve seat 34 is normally closed by a controlling valve 40 extending within the expansion chamber 35 and pressed to its seat by a spring 41 seated on the top of a screw plug 42 screwing in the bottom of the expansion chamber 35. The upwardly extending stem 43 of the controlling valve 40 is engaged at its upper end by a diaphragm 50 held in a diaphragm chamber 51 arranged in the top of the cap 30 and connected by a port or opening 52 with the outlet 14 of the body 12. The diaphragm 50 is fastened in position by a nipple 53 screwed or otherwise secured to the top of the cap 30. The top of the diaphragm 50 is normally pressed on by the lower enlarged end 55 of a rod or stem 56 extending centrally in the nipple 53 and passing through a cap 57 screwed or otherwise secured to the nipple 53. On the lower end or head 55 of the rod or stem 56 rests the lower end of a spring 58 extending within the nipple 53 and engaging a seat 59 swiveled on the under side of the cap 57. By screwing the cap 57 down or up on the nipple 53 the tension of the spring 58 can be regulated, and after the desired adjustment is made the cap 57 can be locked and sealed by a suitable locking and sealing device, if it is desired to do so. It is understood that by the arrangement described a set spring device is provided whereby the diaphragm 50 is alive, lively and resilient at all times. The construction thus far described is practically the same as the one shown and described in the Letters Patent of the United States No. 1,308,638, above referred to, and hence the construction involves no new feature.

The rod or stem 56 projects a distance above the cap 57 and is connected with the governing device 11 arranged directly above the regulator 10. The governing device 11 is constructed as follows: The upper end of the rod or stem 56 is provided with a head 60 having a vertically disposed slot 61 engaged by a pin 62 held on the lower end of a rod or stem 63, the axis of which coincides with the axis of the stem or rod 56. The upper end of the rod or stem 63 terminates in a head 64 engaging the under side of a diaphragm 65 extending over the bottom of a fluid pressure chamber 66 attached to a bracket 67 secured to the cap 30 of the regulator 10. The upward movement of the diaphragm 65 is limited by a stop 68 arranged within the chamber 66. The diaphragm 65 is held in place on the bottom of the chamber 66 by a nipple 70 screwed or otherwise secured to the under side of the chamber 66, and the lower end of the nipple 70 is closed by a cap 71 through which extends slidingly the rod or stem 63. The under side of the head 64 of the rod or stem 63 is pressed on by the upper end of a spring 72 arranged within the nipple 70 and resting with its lower end on a seat 73 swiveled on the top of the cap 71. By adjusting the cap 71 on the nipple 70 the tension of the spring 72 can be increased or diminished according to the direction in which the cap 71 is turned at the time. By the arrangement described an adjustable set spring device is provided for the diaphragm 65 to move the latter in an upward direction, that is, in a direction opposite to that in which the head 55 of the adjustable set spring device of the regulator 10 presses the diaphragm 50. The top of the chamber 66 is connected by a pipe 75 with the delivery pipe 19, as shown in Fig. 1, so that compressed air passes from the delivery pipe 19 into the chamber 66 to exert a downward pressure on the diaphragm 65 against the spring set device of the governing device 11, as above explained. The chamber 66 is also preferably connected by a pipe 80 with a whistle or other signaling or alarm device to actuate the same, as hereinafter more fully explained. The head 60 of the rod or stem 56 of the regulator 10 is provided with a shifting fork 90 engaged by one end 91 of an emergency lever 92 fulcrumed at 93 on the bracket 67 and adapted to be actuated by an operator or by a device 94, such as a movable chain or the like, as indicated in Fig. 1.

From the foregoing it will be seen that two superposed diaphragms 50 and 65 are used and arranged in two separate fluid chambers 51 and 66, and two adjustable spring devices each one made to act independently against the corresponding diaphragm. It will further be noticed that the adjustable spring devices act in opposite directions thus tending to move the diaphragm farther apart with the fluid pressure acting against the bottom of the diaphragm 50 and another fluid acting on the top of the diaphragm 65.

The pressure regulating and governing device is particularly adapted to be used in controlling a fluid at a predetermined pressure to be supplied to one or more engines, pumps or other fluid appliances such as an air compressor, for instance, as indicated in Fig. 1; but in addition to this regulating action a further function is provided by the means shown, namely, to shut off the supply of fluid delivered in case of the rupture of the delivery pipe 19 to the engine pump or other appliance, or again to any other pipe connections it is desired to be made operative, for instance, the delivery pipe to or from various engines or the delivery of an air compressor or steam operated pump. It is understood that the regulator 10 operates as a regulator only in the manner similar to the one described in the Letters Patent above referred to, that is, supplying a motive agent under a reduced pressure. The pressure regulator 10 thus functions automatically but should for any reason a break or a large leak occur in the delivery then a rush of fluid through the regulator takes place with an incidental reduction of pressure in the supply pipe whereby a similar exhaustion of the fluid and reduced pressure in the chamber 66 takes place. The spring 72 now forces the diaphragm 65 upward and in doing so it exerts an upward pull on the rod or stem 56 thus relieving the diaphragm 50 of the pressure of the set spring device to allow the valve 40 to close by its spring 41. When this takes place the pressure in the upper end of the cylinder 26 is reduced or shut off and consequently the main controlling valve 21 moves into closed position on the seat 20 by the action of its spring 22 thereby shutting off the fluid supply through the regulator.

In apparatus of this class it is necessary that provision be made that only after a certain predetermined or abnormal fluctuation takes place that the apparatus should operate without depriving the pressure regulator of its sensitiveness, as otherwise it might stop the work of the engines, pumps or the like. With my improvement above described this result is readily accomplished by permitting adjustment of the tensions of the springs 58 and 72 so that an automatic pressure regulator is provided as well as an automatic shut-off valve in case of a rupture in the fluid supply or on account of an abnormal leak. The regulator may be worked singly if desired by disconnecting the rods 56 and 63 or by releasing the spring set device of the governing device 11 without interfering with the sensitiveness of the regulator 10. The emergency lever 92 permits of using the apparatus at any time as an independent shut-off valve but the emergency lever can be operated from a distant point by a special device and a lever can be used to operate instantly one or more signal alarms so that when the operator is warned he can secure the lever permanently or temporarily in case of an accident. The pipe 80 and alarm or signal 81 is used to give a warning at a distant point.

While in the above description and working of the improvement reference is made to a device controlling steam or fluid to operate an engine which in turn operates a pump, air compressor, or the like, my improvement may be placed in a line operating these motors to automatically shut off the supply of steam in case of a rupture in the supply pipe. My improvement is particularly adapted to shut off the supply of fluid served by the apparatus should a rupture, for instance, occur in the pump delivery line or the air delivery line from a compressor. In most apparatus of this kind in which a reduction of fluid pressure through the rush of the same is the actuating means of a device only one kind of fluid is controlled, that is, the fluid that passes through the apparatus. It is evident, therefore, that the use of such apparatus is limited, in fact, it is impossible to use such apparatus in any other way, as dissimilar fluid like steam and water could not pass through the device unless both fluids were separated. By my improvement as shown and described, two separate distinct fluids are made use of, that is, while steam passes through the regulator 10 and is controlled by the same the other fluid passes into the chamber 66 by way of the delivery pipe of a pump, for instance, and in case such delivery pipe breaks the water pressure is relieved in the upper chamber 66 and the device works automatically as above described with the result that the regulator shuts off the steam operating the pump. The coördination in my apparatus of the various parts, the independent functional features of each supply chamber 51 and 66, while separated and therefore capable, without interference in their functions through different kinds of fluid, enables my improvement to be used with all kinds of different service in the control of fluid where an automatic shut-off valve is necessary and therefore forms a safety device of the first importance without in the least degree diminishing the great sensitiveness of the regulator device proper, and applicable to all kinds of power and industrial plants or marine service, where the apparatus will function as well in all of the steam plants through its complete adjustability to secure all the results desired and not heretofore obtained.

In illustration of the effectiveness as well as safety function of the improvement, we will assume a main steam header feeding several branches or auxiliary lines, and each of these lines operating either a pump leading to a part of delivery, say a storage tank. It is evident that with the same identical apparatus placed upon the branch line, we can run the pump at a predetermined steam pressure, insure proper working of the pump by connecting the pump steam line to fluid chamber 66. Any abnormal reduction of steam in said pipe, through accident, leakage, etc., will shut off the supply through the automatic feature of my improvement, but by connecting the water delivery of the pump, the same reduction of pressure would also shut off the valve, as the pump could not deliver the predetermined pressure of water, should the steam supply fail, so it will be seen therefore, that in many cases, the automatic shut-off valve can produce a double duty, in serving safety against risk of property and even lives, through rupture from either steam line or water line at the same time. Where intermittent service exists, where two pumps or the like are not operated at once from the same supply, it is evident that a double connection might be made, by putting in communication the two delivery pipes of the apparatus, with fluid chamber 66, and by closing a stop cock with one of the connecting pipes, either one of the pump supply of delivery pipes on abnormal reduction of pressure might be made to act as a shut-off valve and shut off all supply.

The apparatus while shown with approximately the same size diaphragms is, of course, designed to meet various conditions of service, and might quite vary in proportion, in accordance with the pressure required, and to be predetermined, and particularly so in the adjusting spring device of fluid chamber 66.

The principle and functions, however, are identical, the spirit of the invention dealing with the preferable or necessary construction; I, therefore, do not limit myself to the exact construction shown, but claim the coördination of the functional elements shown as the spirit of the invention, illustrating through the means shown the working of the apparatus.

Having thus described my invention, I claim as new and desire to secure by Letters Patent:—

1. In an apparatus of the class described, a fluid pressure regulator having a setting device and adapted to control the pressure of a fluid passing through the regulator, an auxiliary pressure device having a setting device and under the influence of another fluid under pressure, the said setting devices being operatively connected with each other to actuate in opposite directions under the influence of their fluids or their setting devices.

2. In an apparatus of the class described, a diaphragm controlled at one side by fluid pressure, a spring device engaging the other side of the diaphragm, a second diaphragm controlled at one side by another fluid pressure, and a spring device engaging the other side of the said second diaphragm, the said spring devices being operatively connected with each other.

3. In a fluid pressure regulator and automatic shut-off valve, a pressure regulator controlling fluid under pressure, a fluid pressure chamber located above said regulator and receiving fluid under pressure, an adjusting spring device part of said regulator, and an adjusting spring device part of fluid pressure chamber, each adjusting device acting in opposite direction.

4. A fluid pressure regulator and automatic shut-off valve, controlling fluid under pressure through a diaphragm, a fluid pressure chamber located above said regulator and closed by a diaphragm, two connected and oppositely acting adjusting spring devices contacting said diaphragms.

5. In a fluid pressure regulator and automatic shut-off valve, a pressure regulator controlling fluid under pressure, through means of a diaphragm, a fluid pressure chamber located above said regulator, a diaphragm in said pressure chamber, the reduced fluid pressure acting under the first diaphragm, the initial fluid pressure in chamber acting on top of diaphragm, independent flexible and resilient adjusting devices acting in opposite direction against said diaphragm, and direct connecting means adjustably uniting the adjusting devices.

6. In a fluid pressure regulator and automatic shut-off valve, the following operative elements: a pressure regulating device capable of maintaining a constant predetermined delivery pressure, a fluid pressure chamber closed by a diaphragm capable to be set independently against another given fluid pressure, means of variable adjustment between said pressures, means of automatically shutting off fluid supply pressure, and emergency means of directly opening or shutting off the supply of delivery pressure.

7. In a fluid pressure regulator and automatic shut-off valve, a pressure regulator having a diaphragm acted upon underneath by the delivery fluid, said diaphragm contacting a controlling valve, and on its other side actuated by pressure setting means located above and part of said regulator, a fluid pressure chamber containing a diaphragm, fluid parts to said chamber to admit pressure on top of said diaphragm, pressure setting means below and contacting said diaphragm, and adjustable connecting means between the lower and upper pressure setting devices.

8. In a fluid pressure regulator and automatic shut-off valve, a pressure regulator having a diaphragm acted upon underneath by the delivery fluid, said diaphragm contacting a controlling valve, and on its other side actuated by pressure setting means located above and part of said regulator, a fluid pressure chamber containing a diaphragm, fluid parts to said chamber to admit pressure on top of said diaphragm, pressure setting means below and contacting said diaphragm, and adjustable connecting means between the lower and upper pressure setting devices, also a fulcrumed lever engaging said adjustable connection independently or to modify or shut off the action of the regulator.

9. In a fluid pressure regulator and automatic shut-off valve, a pressure regulator having a diaphragm acted upon underneath by the delivery fluid, said diaphragm contacting a controlling valve and on its other side actuated by pressure setting means located above and part of said regulator, a fluid pressure chamber containing a diaphragm, fluid parts to said chamber to admit pressure on top of said diaphragm, pressure setting means below and contacting said diaphragm, and adjustable connecting means between the lower and upper pressure setting devices, also a fulcrumed lever engaging said adjustable connection to modify or shut off the action of the regulator, the adjustable connection being capable to be separated from the upper fluid chamber, and the apparatus reverting to a pressure regulator at a predetermined pressure without interfering with its adjusting spring device.

JULES P. METZGER.